United States Patent [19]

Matsubayashi et al.

[11] Patent Number: 5,249,171
[45] Date of Patent: Sep. 28, 1993

[54] OPTO-MAGNETIC PICK-UP DEVICE INCLUDING PHASE DIFFERENCE CORRECTING MEANS

[75] Inventors: Nobuhide Matsubayashi; Tsuneo Yanagida; Kiichi Kato, all of Hachioji, Japan

[73] Assignee: Olympus Optical Company Ltd., Japan

[21] Appl. No.: 697,910

[22] Filed: May 1, 1991

Related U.S. Application Data

[63] Continuation of Ser. No. 547,378, Jul. 2, 1990, abandoned, which is a continuation of Ser. No. 311,423, Feb. 14, 1989, abandoned, which is a continuation of Ser. No. 814,675, Dec. 30, 1985, abandoned.

[30] Foreign Application Priority Data

Dec. 30, 1984 [JP] Japan ................ 59-280856

[51] Int. Cl.$^5$ .................. G11B 7/12; G11B 13/04
[52] U.S. Cl. ..................... 369/110; 369/13; 360/114
[58] Field of Search .......... 369/13, 110, 112; 360/59, 114; 365/122; 350/405, 403, 400; 356/368

[56] References Cited

U.S. PATENT DOCUMENTS

| | | | |
|---|---|---|---|
| 4,298,284 | 11/1981 | Yamamoto et al. | 356/368 |
| 4,409,631 | 10/1983 | Matsumoto | 369/110 |
| 4,569,035 | 2/1986 | Tomita | 365/122 |
| 4,573,149 | 2/1986 | Deguchi et al. | 369/13 |
| 4,599,714 | 7/1986 | Endo | 369/13 |
| 4,638,470 | 1/1987 | Connell et al. | 369/13 |
| 4,672,593 | 6/1987 | Ojima et al. | 369/110 |

FOREIGN PATENT DOCUMENTS 60-151855  8/1985  Japan .

OTHER PUBLICATIONS

Voegeli, IBM Tech. Discl. Bulletin, vol. 11, No. 10, Mar. 1969, "Recording and Readout System".
Matsuura et al, "Measurement of Optical Phase Difference Using a Polarization Technique", Optics +Laser Tech., Dec. 1977, p. 289.
Ferrard, The Journal of the Optical Society of America vol. 44, No. 8, Aug. 1954; pp. 634–640.
Bennett et al, Handbook of Optics, section 10, pp. 102–106.
Bennett et al, Handbook of Optics, section 10, pp. 139–141.

Primary Examiner—Hoa T. Nguyen
Attorney, Agent, or Firm—Bruce L. Adams; Van C. Wilks

[57] ABSTRACT

An opto-magnetic pick-up device for use in an information recording and reproducing device is disclosed. The device comprises a phase difference correcting device capable of correcting the phase difference between the linearly polarized component of the reflected light from the recording medium and a polarized component vertical to the linearly polarized component.

14 Claims, 4 Drawing Sheets

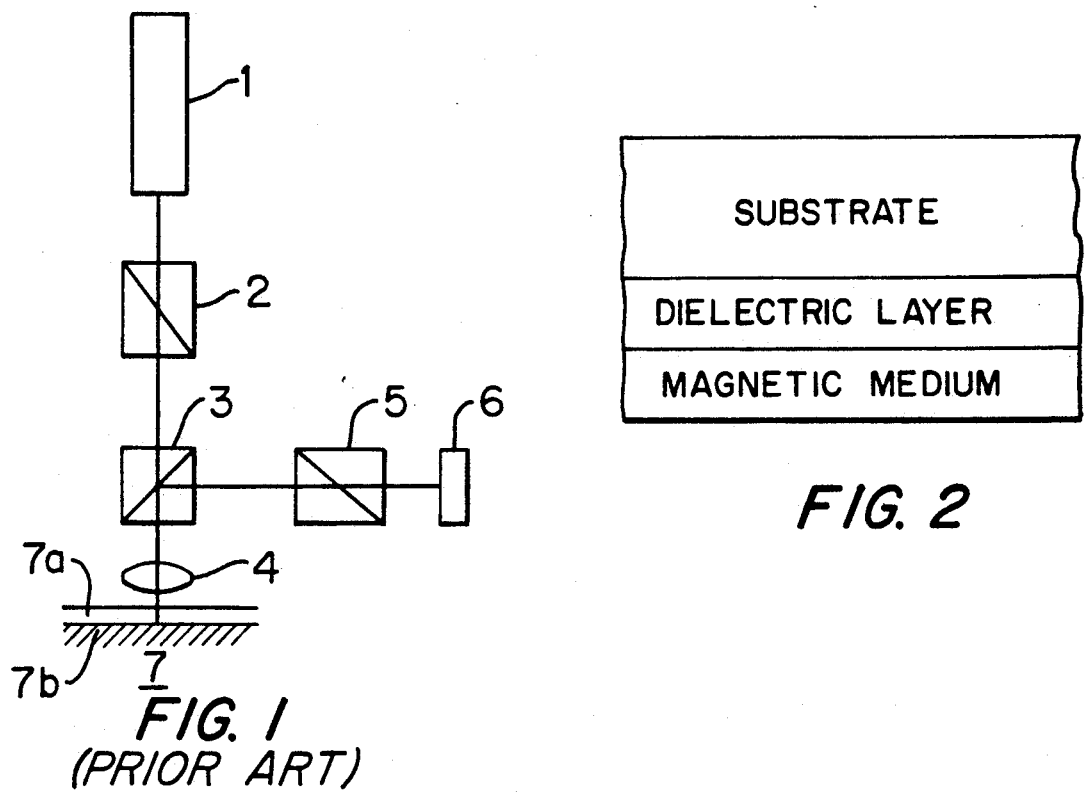
FIG. 1 (PRIOR ART)
FIG. 2
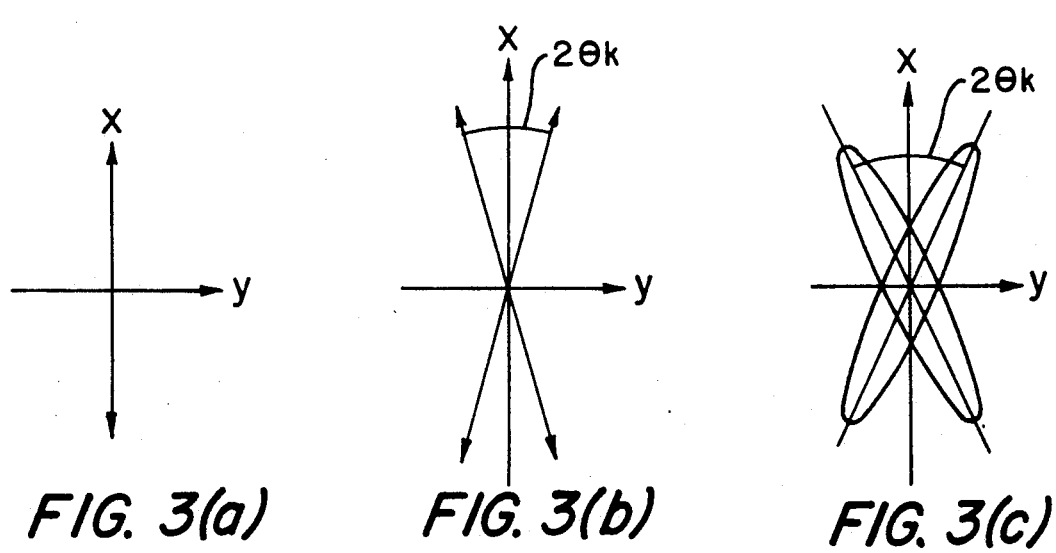
FIG. 3(a)   FIG. 3(b)   FIG. 3(c)

OPTO-MAGNETIC PICK-UP DEVICE INCLUDING PHASE DIFFERENCE CORRECTING MEANS

This is a continuation application of parent application Ser. No. 547,378 filed Jul. 2, 1990, now abandoned which is a continuation application of grandparent application Ser. No. 311,423 filed Feb. 14, 1989, now abandoned which in turn is a continuation application of great-grandparent application Ser. No. 814,675 filed Dec. 30, 1985, now abandoned.

BACKGROUND OF THE INVENTION

The present invention relates to an opto-magnetic pick-up device for use in an information recording, reproducing and erasing apparatus which utilizes an opto-magnetic effect.

The opto-magnetic recording and reproducing effect means that a writing light beam is irradiated onto a magnetic recording medium having an easy axis in the vertical direction to the surface of the medium to reverse its magnetization thereby performing information recording, and a reading light beam is irradiated onto the medium to detect the difference in rotation of the polarization surface caused by the direction of magnetization due to the Kerr effect thereby reproducing the recorded information.

FIG. 1 shows a fundamental construction of a conventional optical magnetic pick-up device. A light emanated from a laser unit 1 such as a He-Ne laser or a semiconductor laser is formed into a linearly polarized light by a polarizer 2 and incident onto a magnetic recording medium 7 through a beam splitter 3 and an objective lens 4. The light reflected by the medium 7 again passes through the lens 4, is reflected by the beam splitter 3 and incident onto a light detector 6 through an analyzer 5 thereby detecting the recorded information.

The magnetic recording medium 7 comprises a substrate 7a and a magnetic medium 7b which is formed on the substrate 7a by vapor deposition or sputtering magnetic medium material on the substrate 7a. As a material for the substrate 7a, glass, PMMA, polycarbonate and the like can be used. These materials have birefringence characteristics. For example, double refraction of glass and acryle is less than 10 nm and that of polycarbonate is an order of few tens ~100 nm.

As shown in FIG. 3a, the light incident on the recording medium 7 is a linearly polarized light which oscillates only in a certain direction (this case, X axis direction). When such a linearly polarized light is incident onto the recording medium 7 which is magnetized in the direction vertical to its surface, the light reflected by the recording medium 7 has a polarization plane rotated by $\theta_K$ due to the Kerr effect as shown in FIG. 3b. That is, the polarization plane of the reflected light is rotated by $\pm\theta_K$ in accordance with the magnetizing direction and thus this rotation can be converted into the light strength by the analyzer 5 thereby obtaining reproduced signals.

While, if the substrate has a double refraction property the reflected light becomes an elliptically polarized light as shown in FIG. 3c without rotating as the linearly polarized light. A further factor causing elliptic polarization is a Kerr ellipse other than a Kerr rotation due to the magnetic Kerr effect.

Provided that the incident and reflected lights are polarized, the x component of the reflected light is $\gamma_{xx}$, and the y component is $\gamma_{xy}$, and the following relations are found.

$$\gamma_{xx} = |\gamma_{xx}| \exp(i\phi_x) \quad (1)$$

$$\gamma_{xy} = |\gamma_{xy}| \exp(i\phi_y) \quad (2)$$

$$\text{If } \tan\alpha = |\gamma_{xy}|/|\gamma_{xx}| \quad (3)$$

an angle of Kerr rotation $\theta_K$, an angle of ellipticity $\gamma_K$ and a reflection factor R may be represented by following equations:

$$\tan 2\theta_K = \tan 2\alpha \cos(\phi_y - \phi_x) \quad (4)$$

$$\sin 2\gamma_K = \sin 2\alpha \sin(\phi_y - \phi_x) \quad (5)$$

$$R = |\gamma_{xx}|^2 + |\gamma_{xy}|^2 \quad (6)$$

Where the term $\phi_y - \phi_x$ is a phase difference caused by the Kerr effect. This phase difference becomes large when, as shown in FIG. 2, an enhancement means is used for the recording medium 7. That is, as shown in FIG. 2, a dielectric layer is provided between the substrate and the magnetic medium in order to increase the angle of Kerr rotation $\theta_K$ by the enhancement means. In this case, the phase difference $\phi_y - \phi_x$ often becomes large due to the thickness of the recording medium.

Large double refraction of the substrate corresponds to a large phase difference. If the double refraction is 100 nm for the light with wavelength of 830 nm, the phase difference thereof is about 43°.

If the phase difference is large, $\theta_K$ becomes small and $\gamma_K$ becomes large in accordance with the equations (4) and (5). A S/N ratio at reproduction may be generally represented by a following equation.

$$S/N \propto \sqrt{R} \sin 2\theta_K \cos 2\gamma_K \quad (7)$$

As the phase difference is large, the S/N ratio becomes deteriorated in accordance with the equation (7).

For example, if the phase difference is 0° and 45°, $\theta_K$ is decreased to 0.7, even taking only the term $\sin\theta_K$ in the equation (7) into consideration, the S/N ratio is described by about 3 dB.

SUMMARY OF THE INVENTION

It is an object of the present invention to eliminate the above described disadvantages of the conventional opto-magnetic pick-up device. It is also an object of the present invention to provide an opto-magnetic pick-up device for recording, reproducing and erasing information, the inventive device having a phase correcting means for correcting a phase difference of light beams reflected from a magnetic recording medium.

It is another object of the present invention to provide an opto-magnetic pick-up device in which the phase difference of the reflected light which is elliptically polarized by the double refraction and the Kerr ellipse of the substrate is corrected to obtain the linearly polarized light, and the angle of Kerr rotation is increased to increase the S/N ratio of the reproduced signal.

According to the present invention the phase difference between the linearly polarized light component and the polarized light component in the direction vertical thereto of the light reflected from the opto-magnetic recording medium, is made substantially zero by means of a phaser, a total reflection prism, a total reflecting mirror, a beam splitter or the like.

BRIEF DESCRIPTION OF THE DRAWINGS

FIG. 1 is an explanatory view showing a construction of an optical system of the conventional opto-magnetic pick-up device;

FIG. 2 is an explanatory view showing a construction of the enhancement light disc;

FIG. 3a-3c are explanatory views showing the condition of the incident light and the reflected light for the recording medium;

DETAILED EXPLANATION OF THE PREFERRED EMBODIMENT

Figure 4:
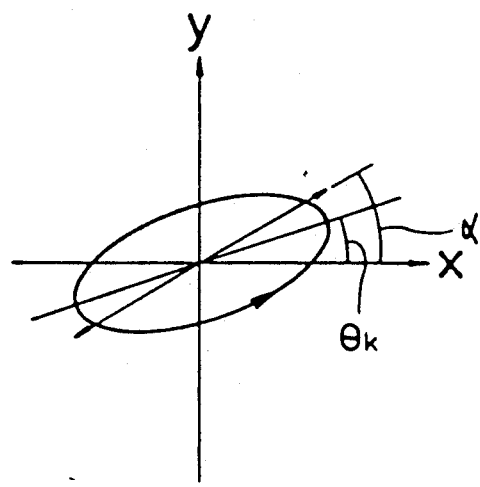
FIG. 4 is an explanatory view showing the elliptically polarized condition of the reflected light.

Referring now to the drawing, there are shown embodiments of an opto-magnetic pick-up device according to the present invention.

In the following description, the phase difference term $\phi_y - \phi_x = -45°$. This is applied to the double refraction and the recording medium is an opto-magnetic circular disc. In this case, the axial direction of fast double refraction is a diameter direction of the disc, and the axial direction of slow double refraction is a peripheral direction of the disc with a phase difference of $\lambda/8$. The linear polarizing direction (X axis) of the incident and the reflected light is parallel to the peripheral direction.

As shown in FIG. 4, from the condition $\phi_y - \phi_x = -45°$, if the polarization plane is rotated by $+\theta_K$, the light is elliptically polarized in the counterclockwise direction, and if the plane is rotated by $+\theta_K$, the light is elliptically polarized in the clockwise direction. For the total reflecting mirror, in order to make such an elliptic polarization a linear polarization, it is preferred to utilize a total reflecting mirror capable of obtaining a difference between a phase shift $\delta_P$ for P polarization and a phase shift $\delta_S$ for S polarization.

Figure 5:
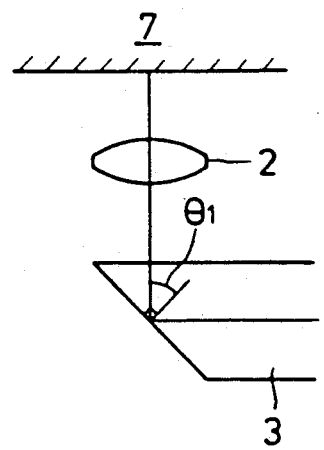
FIG. 5 is an explanatory view showing the principle of the opto-magnetic pick-up device according to the present invention.

For example, as shown in FIG. 5, the light reflected from the recording medium is incident onto a glass having a reflection factor $n_G$ in such a manner that the light is incident onto a boundary plane to the air at an angle $\theta_1$ larger than the critical angle. In this case, the phase shift $\delta_S$ for S polarization may be obtained by the following equation.

$$\tan \frac{\delta_S}{2} = \frac{\sqrt{\sin^2 \theta_1 - (1/n_G)^2}}{\cos \theta_1} \quad (8)$$

The phase shift $\delta_P$ for P polarization may be obtained by the following equation:

$$\tan \frac{\delta_P}{2} = \frac{\sqrt{\sin^2 \theta_1 - (1/n_G)^2}}{(1/n_G)^2 \cos \theta_1} \quad (9)$$

If $\delta = \delta_P - \delta_S$, following equation is obtained $$\tan \frac{\delta}{2} = \frac{\cos \theta_1 \sqrt{\sin^2 \theta_1 - (1/n_G)^2}}{\sin \theta_1} \quad (10)$$

It is found from the above that a phase difference of the phase shift $\delta$ is obtained for P polarization and S polarization due to the total reflection. If $n_G = 1.51$, and $\theta_1 = 45°$, the phase shift $\delta$ becomes $\delta \approx 38.6°$.

Provided, therefore, that the linear polarization of the incident and the reflected light becomes S polarization at the total reflection plane, that is, the polarization in the X axis direction of FIG. 1 becomes S polarization. In this case, the phase difference $\Delta$ of light after reflection by the total reflecting mirror is obtained as follows.

$$\begin{aligned} \Delta &= (\phi_y + \delta_P) - (\phi_x + \delta_S) = (\phi_y - \phi_x) + (\delta_P - \delta_S) \\ &= -45° + 38.6° = -6.4° \end{aligned}$$

It is found from the above that the phase difference is small and thus the light becomes linear polarization. When the term $\phi_y - \phi_x$ in the equations (4) and (5) is substituted by $-6.4°$, the angle of Kerr rotation $\theta_K$ is increased from 0.46° to 0.65°, and the angle of ellipticity $\gamma_K$ is decreased from 0.46° to 0.07°. If S/N is S in the case of no correction and S/N is S' after correction, as shown from the equation (7), S/N may be improved according to the large $\theta_K$ and small $\gamma_K$ and represented by the following equation:

$$\frac{S'}{S} = \frac{\sin 1.3°}{\sin 0.92°} \cdot \frac{\cos 0.14}{\cos 0.92} \approx 1.4$$

As seen from the above equation, S/N may be increased to about 3dB by performing the correction.

Figure 6A:
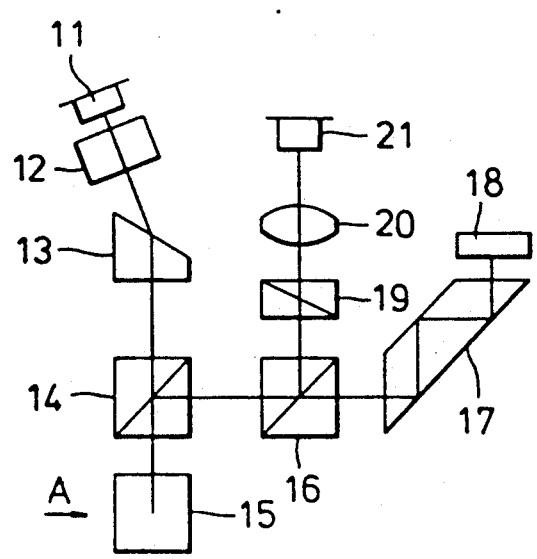
FIGS. 6a and 6b are plan view showing a construction of one embodiment of an opto-magnetic pick-up device according to the present invention.
Figure 6B:
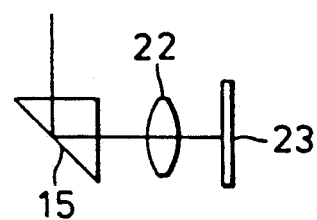

FIGS. 6a and 6b show one embodiment of the opto-magnetic pick-up device according to the present invention. The light (linearly polarized light) emanated from a semiconductor laser (LD) 11 is converted to a collimated light by a collimater lens 12 and converted to a light having substantially circular intensity distribution by a shaping prism 13. This light is incident onto a beam splitter 14 with P polarization and the light through the splitter is incident onto a total reflection prism 15 with S polarization. FIG. 6b is an explanatory view showing the prism 15 and the like shown in FIG. 6a in the direction of an arrow A. In this case, the phase shift is generated by reflection by the prism 15 but the elliptic polarization is not generated, since the light incident onto the total reflection prism 15 has only the S polarization component. The elliptically polarized light reflected from the recording medium, i.e. an optical disc 23, and is again reflected by the prism 15 thereby obtaining linearly polarized light. The light is further reflected by the beam splitter 14 and a beam splitter 16, and incident onto an APD21 through an analyzer 19 thereby obtaining electrical signals.

The focusing and the tracking controls are performed by a critical angle prism 17 and a four divided detector 18.

The phase difference between P polarization and S polarization caused by total reflection is changed the refraction factor of a material, for example, the material comprising the substrate for the prism 15 and the incident angle of the light, as seen from the equation (10), so that it is possible to correct the phase difference more precisely and to correct the phase difference, which is different for different kinds of medium, by changing the material of the glass or the polarizing angle.

It is also possible to change the phase difference optionally at reflection by changing the thickness and the composition of a dielectric thin layer coated on, for example the surface of the glass.

Figure 7:
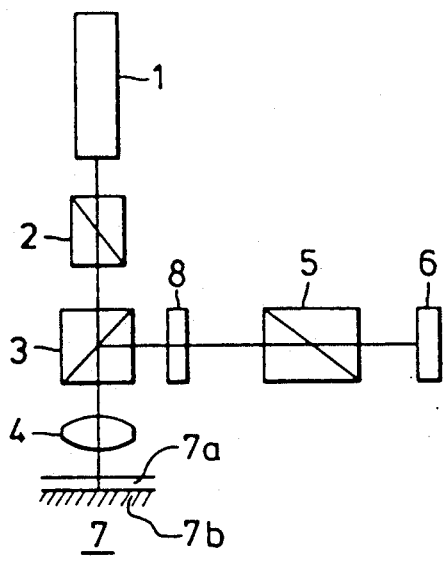
FIG. 7 is a plan view showing a construction of another embodiment of the opto-magnetic pick-up device according to the present invention.

FIG. 7 shows another embodiment of the opto-magnetic pick-up device according to the present invention. In FIG. 7 the same reference characters designate corresponding parts as shown in FIG. 1. In this embodiment, a phaser 8 is provided between the beam splitter 3 and the analyzer 5. The phaser 8 has a retardation characteristic such that the phase difference $\Delta = \phi_y - \phi_x$ between the x component and the y component of the light reflected from the recording medium is corrected to be zero. When a $\frac{1}{8}$ wave plate 8 having a phase difference of 45° is utilized as a phaser, the difference may be made zero. In this case, as seen from the equation (4), $\theta_K$ may be obtained as follows:

$$\tan 2\theta_K = \tan 2\alpha \times \cos 45°$$

$$\theta_K \approx 0.707\alpha$$

According to this embodiment, $\theta_K$ may be obtained as $\theta_K \approx \alpha$, which is about 1.4 times larger than $0.707\alpha$.

Figure 8:
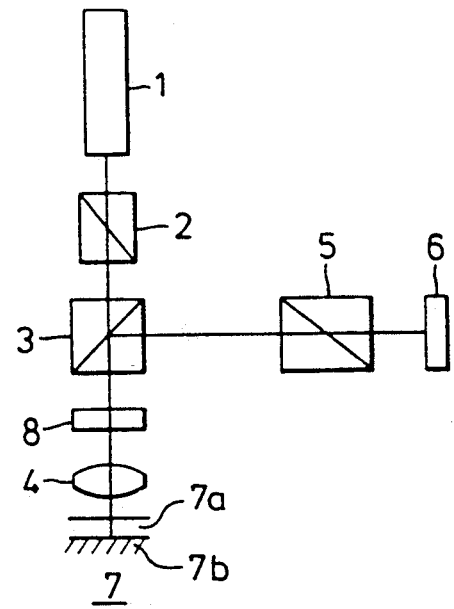
FIG. 8 is a plan view showing a modified form of the pick-up device shown in FIG. 7.

A modified embodiment of the pick-up device shown in FIG. 7 is represented in FIG. 8, wherein the same reference characters designate the corresponding parts as shown in FIG. 7. In this embodiment, the wave plate 8 as phaser is provided between the objective lens 4 over the recording medium 7 and the beam splitter 3. The remaining construction of the pick-up device is the same as that of the pick-up device shown in FIG. 7 so that the detailed explanation thereof is omitted.

Figure 9:
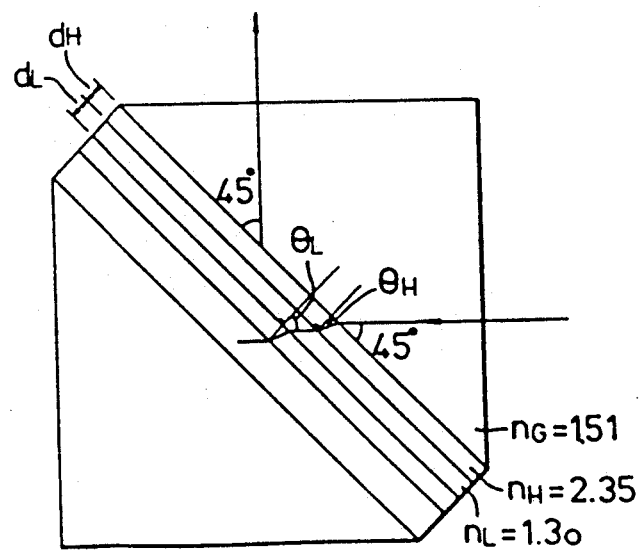
FIG. 9 is an explanatory view showing a construction of a beam split as a phase difference correcting means according to the present invention.
Figure 11:
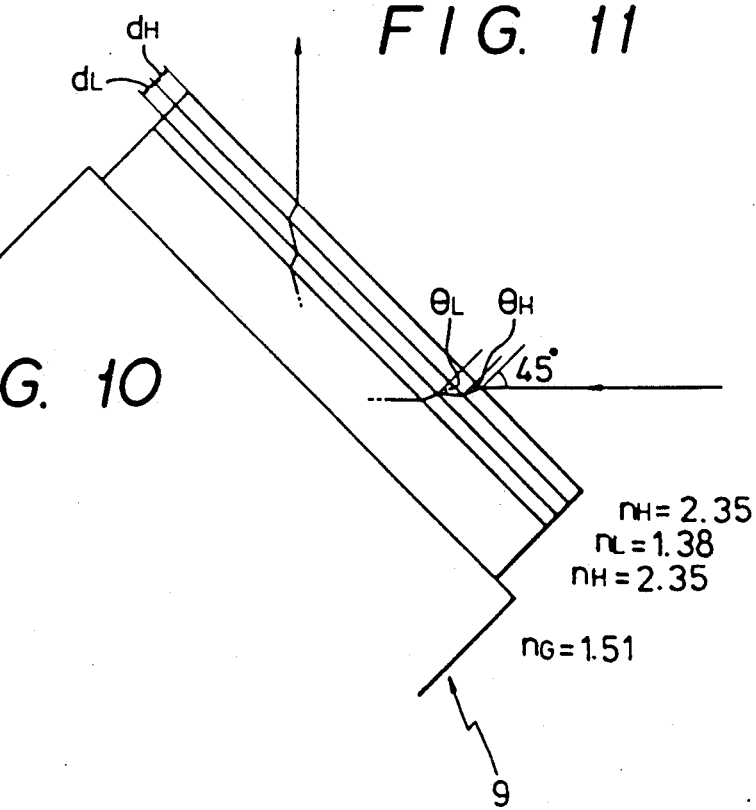
FIG. 11 is an explanatory view showing a construction of the total reflecting mirror having the phase difference correcting means.

A third embodiment of the opto-magnetic pick-up device using a beam splitter as a phase difference correcting means is shown in FIG. 9. In order to correct the phase difference by the beam splitter, in the device shown in FIG. 1, the beam splitter 3 may be so arranged that the phase difference is generated between P polarization and S polarization at reflection. To this end, for example, the beam splitter 3 is constructed by coating multiple layers of dielectric between two glass layers having $n_G = 1.51$.

As shown in FIG. 9, the dielectric layer is constructed by laminating $T_iO_2$ layer of $n_H = 2.35$ and $M_gF_2$ layer of $n_L = 1.38$ alternately, thereby making the thickness of respective layers the proper value, so that it is possible to control the reflection factor P and S polarizations and the phase shift due to reflection.

If the number of the dielectric layers is 9, the thickness of $T_iO_2$ is $d_H$, the thickness of $M_gF_2$ is $d_L$, the thickness of the first to the fourth layers is $n_H d_H \cos\theta_H = n_L d_L \cos\theta = 190$ nm, and the thickness of the fifth to the ninth layers is 240 nm. When the semiconductor laser is used as a light source, the respective reflection factors R and respective phase shifts may be obtained as follows:

For $\lambda = 820$ nm $R_P = 42.7\%$  $R_S > 99\%$ $\delta_P - \delta_S = -44.3°$ For $\lambda = 830$ nm $R_P = 46.2\%$  $R_S > 99\%$ $\delta_P - \delta_S = -37.4°$ For $\lambda = 840$ nm $R_P = 48.8\%$  $R_S > 99\%$ $\delta_P - \delta_S = -31.1°$ This condition is explained with reference to FIG. 1. If the direction of incident linearly polarized light is set to be P polarization for the beam splitter 3, the light reflected from the recording medium 7 is reflected by the beam splitter 3, thereby obtaining the phase difference as follows:

$$(\phi_y + \delta_S) - (\phi_x + \delta_p) = (\phi_y - \phi_x) - (\delta_p - \delta_S)$$

In this case, since $\phi_y - \phi_x = -45°$ and $\delta_p - \delta_S \approx -31°$ to $-44°$, the phase difference becomes substantially cancelled so that the light incident onto the analyzer 5 becomes substantially linearly polarized.

Figure 10:
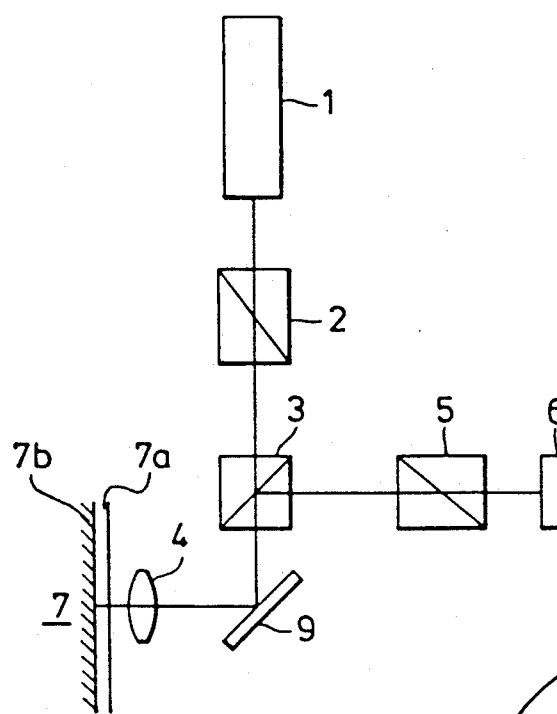
FIG. 10 is a plan view showing a construction of an optical system of another opto-magnetic pick-up device having the phase difference correcting means according to the present invention.

FIG. 10 shows an optical system of the opto-magnetic pick-up device using a total reflecting mirror as the phase difference correcting means.

In this embodiment a total reflecting mirror 9 is arranged between the beam splitter 3 and the objective lens 4. The remaining construction of the device is the same as that of the optical system shown in FIG. 1 so that the explanation thereof is omitted.

The total reflecting mirror 9 is constructed by coating, for example, $T_iO_2$ and $M_gF_2$ dielectric layer of $n_H = 2,35$ and $n_L = 1.38$ on the glass of $n_G = 1.51$.

If seven $T_iO_2$ and $M_gF_2$ layers are coated alternately on the glass layer to obtain the thickness of $n_H d_H \cos\theta_H = n_L d_L \cos\theta_L = 200$ nm and then eight $T_iO_2$ and $M_gF_2$ layers are coated alternately on the glass layer to obtain the thickness of $n_H d_H \cos\theta_H = n_L d_L \cos\theta_L = 240$ nm, the respective reflection factors R and respective phase shifts $\delta$ may be obtained as follows:

For $\lambda = 820$ nm $R_P = 96.8\%$  $R_S > 99\%$ $\delta_p - \delta_S = -46.5°$ For $\lambda = 830$ nm $R_P = 97.9\%$  $R_S > 99\%$ $\delta_P = \delta_S = -37.8°$ for $l = 840$ nm $R_P = 98.5\%$  $R_S > 99\%$ $\delta_P - \delta_S = -31.0°$ In this embodiment, it is possible to correct the phase difference of the light reflected from the recording medium 7 in the same manner as the beam splitter 3.

In this embodiment the beam splitter 3 is formed as a multiple layer construction incapable of generating the phase difference even by reflection. As described above, according to the present embodiments, the reflection factor and the phase difference may be controlled, and the light reflected from the recording medium 7 may be converted to the linearly polarized light from the elliptically polarized light, by changing the material, the layer number and the thickness of the multiple layers of the beam splitter 3 and the total reflecting mirror 9.

The present invention is not limited to the above embodiments and may be changed, without departing from the scope of the invention. For example, the phase difference may be corrected by both the beam splitter and the total reflecting mirror. It is also possible to correct the phase difference by transmitting the light through the beam splitter instead of reflection. In such a manner, the conversion of the elliptic polarization to the linear polarization may also be made $\theta_K$ large.

When $\phi_y - \phi_x = -45°$ in the equation (1), $|\theta_{K'}| = 0.7\alpha$

If $\phi_y - \phi_x = 0$ $|\theta_{K'}| = \alpha$

Figure 12:
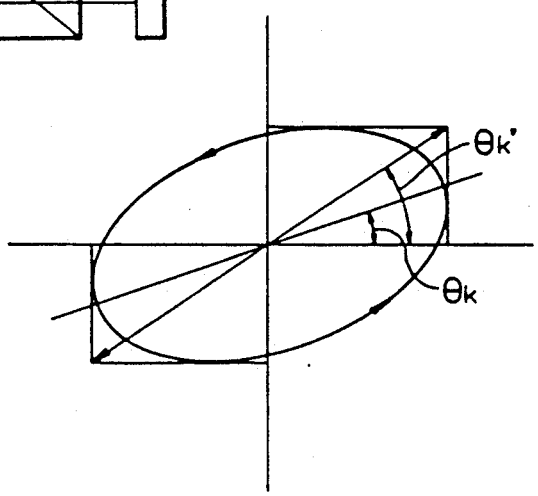
FIG. 12 is an explanatory view showing an effect of the pick-up device according to the present invention.

Therefore, $|\theta_{K'}| \approx 1.4|\theta_K|$ so that as shown in FIG. 12, the angle of Kerr rotation becomes large.

According to the equation (5), the angle of ellipticity $\delta_K$ becomes zero and it is found from the equation (7) representing S/N that the S/N ratio may be greatly improved largely.

What is claimed is:

1. An optomagnetic pick-up device for reproducing information on a magnetic recording medium of a type having a substrate which exhibits birefringence characteristics, comprising: a focussing lens; means for irradiating light beams focused through the lens on the magnetic recording medium; a photodector; a beam splitter for directing light beams reflected from the magnetic recording medium to the photodetector; and phase difference correcting means for correcting a phase difference of light beams reflected from the magnetic recording medium, the phase difference correcting means being disposed between the lens and the beam splitter and including a total reflection optical element having a reflecting surface coated with a dielectric thin film for correcting the phase difference caused by double refraction of light beams reflected from the magnetic recording medium.

2. An opto-magnetic pick-up device according to claim 1, wherein the dielectric film comprises a multiple layer structure.

3. An opto-magnetic pick-up device according to claim 1; wherein the pick-up device further includes the magnetic recording medium, the substrate of the magnetic recording medium being selected from the group consisting of glass, PMMA and polycarbonate, wherein the magnetic recording includes a magnetic thin film disposed on the substrate and having an easy axis in the vertical direction.

4. An opto-magnetic pick-up device according to claim 1; wherein the total reflection optical element comprises a total reflection prism.

5. An opto-magnetic pick-up device according to claim 4; wherein the dielectric film comprises a multiple layer structure.

6. An opto-magnetic pick-up device according to claim 1; wherein the total reflection optical element comprises a total reflection mirror.

7. An opto-magnetic pick-up device according to claim 6; wherein the dielectric film comprises a multiple layer structure.

8. An opto-magnetic pick-up device according to claim 7; wherein the dielectric thin film comprises $TiO_2$ film and $MgF_2$ film which are alternately superimposed.

9. An opto-magnetic pick-up device for reproducing information by irradiating light beams on a magnetic recording medium of a type having a substrate which exhibits birefringence characteristics, comprising: a light source for irradiating light beams; a lens for focusing the light beams the magnetic recording medium; a photodetector for detecting light beams reflected from the magnetic recording medium; a beam splitter for directing light beams reflected from the magnetic recording medium to the photodetector; and phase difference correcting means disposed between the lens and the beam splitter in spaced-apart relation from the magnetic recording medium for correcting a phase difference of light beams reflected from the magnetic recording medium, the phase difference correcting means including a total reflection optical element having a reflecting surface coated with a dielectric film effective for correcting the phase difference caused by double refraction of light beams reflected from the magnetic recording medium.

10. An opto-magnetic pick-up device according to claim 9, wherein the dielectric film comprises a multiple layer structure.

11. An opto-magnetic pick-up device according to claim 9, wherein the total reflection optical element comprises a total reflection prism.

12. An opto-magnetic pick-up device according to claim 9, wherein the total reflection optical element comprises a total reflection mirror.

13. An opto-magnetic pick-up device according to claim 12, wherein the dielectric film comprises a multiple layer structure.

14. An opto-magnetic pick-up device according to claim 9; wherein the pick-up device further includes the magnetic recording medium, the substrate of the magnetic recording medium being selected from the group consisting of glass, PMMA and polycarbonate wherein the magnetic recording medium includes a magnetic thin film disposed on the substrate and having an easy axis in the vertical direction.

* * * * *